Figure 1:
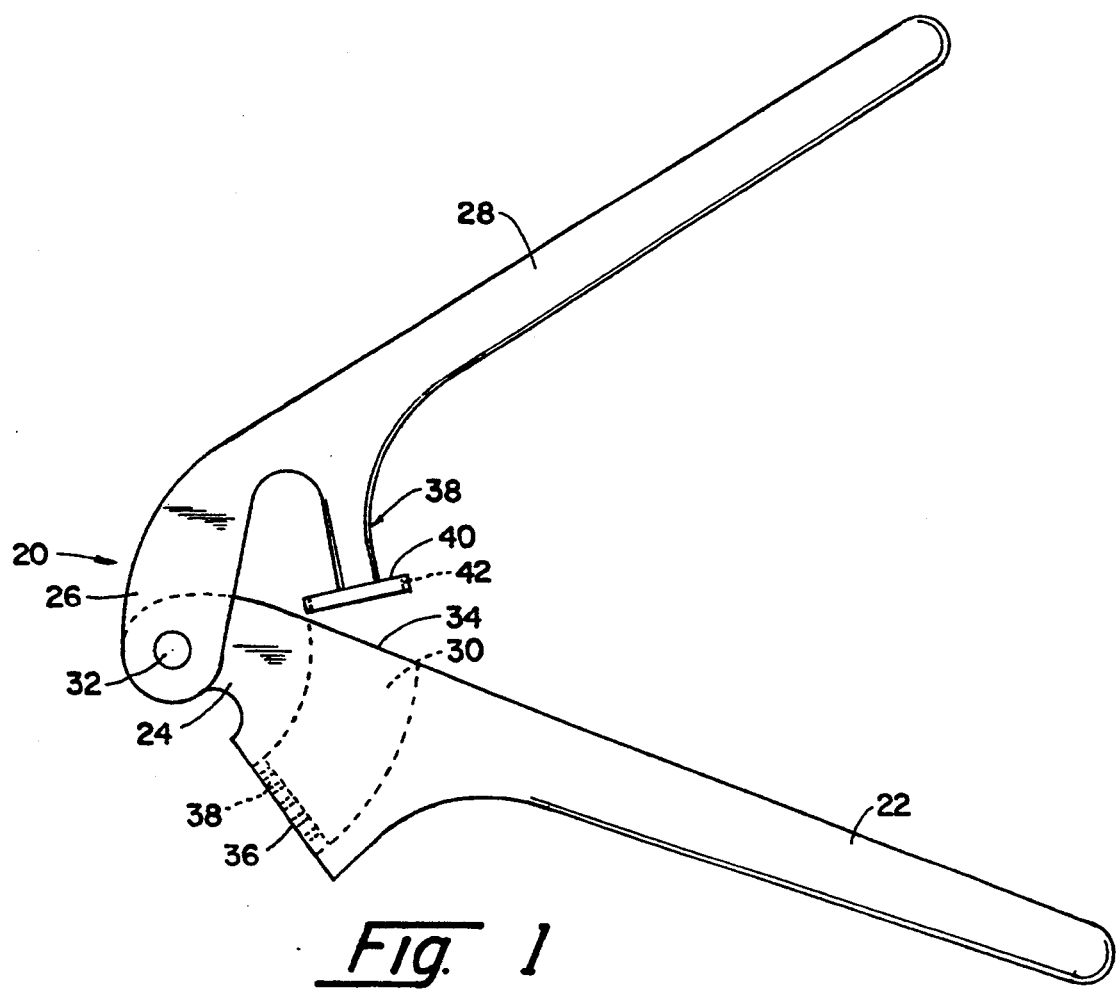

United States Patent [19]

Lackie

[11] Patent Number: 5,370,044

[45] Date of Patent: Dec. 6, 1994

[54] GARLIC PRESS

[75] Inventor: Steve J. Lackie, Lexington, Mass.

[73] Assignee: Sapidyne, Inc., Boise, Id.

[21] Appl. No.: 839,348

[22] Filed: Feb. 20, 1992

[51] Int. Cl.⁵ .............................................. B30B 9/00
[52] U.S. Cl. ................... 100/234; 100/125; 99/495
[58] Field of Search ............ 100/234, 125, 243; 99/495, 458, 506

[56] References Cited

U.S. PATENT DOCUMENTS

| | | | |
|---|---|---|---|
| 2,503,572 | 4/1950 | Winson | 100/125 |
| 2,705,368 | 4/1955 | Tascher | 100/244 |
| 4,545,299 | 10/1985 | Ahner | 100/234 |
| 4,582,265 | 4/1986 | Petronelli | 100/234 |
| 4,794,854 | 1/1989 | Swaim | 100/112 |

Primary Examiner—David A. Scherbel
Assistant Examiner—Reginald Alexander
Attorney, Agent, or Firm—Lappin & Kusmer

[57] ABSTRACT

A hand press which includes a first lever arm having adjacent one end thereof a hollow receptacle having one end opened, the other end covered by a perforated screen, and a second lever arm pivotally mounted at the one end of the first lever arm. A piston is fixedly positioned on the second arm for insertion into the open end of the receptacle, the receptacle typically being shaped as a toroidal segment having its axis of elongation conforming to an arc having a mean radius of curvature defined by the distance between the pivot point and the center of the face of the piston. The periphery of the piston face is provided with a ring to insure a tight sliding fit of the piston in the receptacle.

3 Claims, 1 Drawing Sheet

GARLIC PRESS

This invention relates generally to food processing, and more particularly to a device for crushing and extruding botanicals such as fruits, vegetables, ginger, garlic cloves and the like.

Despite the plethora of types of hand-operated presses, hereinafter generically referred to as garlic presses, that have been available over the several past decades there appears to be a large number of individuals who are dissatisfied with the state of the art. Some prior art presses based on advancing a crushing piston by rotation of a threaded rod, operate with a sluggishness unacceptable to a cook who wants simply to crush a garlic clove in short order. Many presses, based on the use of a lever arm to force a piston into a cylinder and extrude crushed garlic through a screen leak nearly as much crushed garlic backwardly around the periphery of the piston as is forced through the screen. A number of prior art presses use a right-angle cylinder as a receptacle in which the botanicals are to be pressed, and thus employ a piston that is pivotally mounted on a handle in order to compensate or adjust the arcuate motion of the handle to the linear configuration of the receptacle.

A principal object of the present invention is to provide a hand-held garlic press that overcomes these problems of the prior art.

These and other objects of the present invention are realized by the provision of a garlic press of the type that employs a first lever arm having adjacent one end thereof a fixedly positioned receptacle extending therethrough with one end of the receptacle being covered by a perforated screen, the other end being open; and a second lever arm having a first end thereof pivotally mounted on the one end of the first lever arm and bearing a piston fixedly positioned with respect to the second lever arm for insertion into the open end of the receptacle. In the instant invention, the piston is an elongated element at least the head of which has a predetermined, invariant cross-sectional configuration and dimensions, and the receptacle is an elongated hollow element having a matching cross-section of invariant shape and dimension along the entire length of the receptacle, the piston typically being preferably about the same length as the depth of the receptacle. Most importantly, the receptacle is shaped to have an axis of elongation conforming to a common arc having a mean radius of curvature defined by the distance between the connecting pivot point and the center of the face of said piston. Preferably, the piston is formed of stainless steel or the like with a wafer or closed cylinder of short length forming a face insertable into the open end of the receptacle, the latter in turn being then a segment of a hollow, stainless steel toroid with a circular cross-section and a circular toroidal curvature determined by the distance from the pivot point to the center of the piston face. In the preferred embodiment, means are provided for edging the periphery of the piston face with a ring to insure a tight sliding fit within the receptacle.

Other objects of the present invention will in part appear obvious and will in part appear hereinafter. The invention accordingly comprises the apparatus embodying features of construction, combinations of elements, and arrangement of parts, all as exemplified in the following detailed disclosure, and the scope of the application of which will be indicated in the claims.

Figure 2:
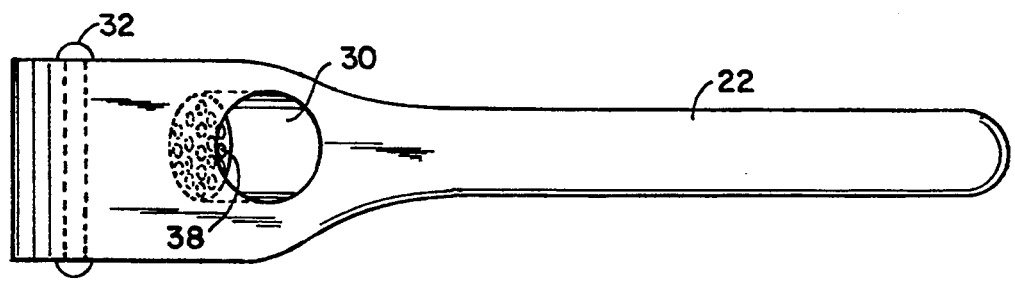

For a fuller understanding of the nature and objects of the invention, reference should be had to the following detailed description taken in connection with the accompanying drawing wherein:

FIG. 1 is a side elevational view of a press embodying the principles of the present invention; and FIG. 2 is a top plan view of the receptacle portion of the press of FIG. 1.

Referring now to FIG. 1 there will be seen an embodiment of manually operable or hand press 20 comprising first elongated lever arm 22 having one end 24 thereof pivotally connected to a corresponding end 26 of second elongated lever arm 28. At a portion of lever arm 22, adjacent end 24 thereof, there is provided receptacle 30 extending transversely and completely through that portion of the lever arm. Preferably, receptacle 30 is formed in lever arm 22 as an elongated hollow tube having a cross-section of invariant configuration, preferably circular, the diameter of which is fixed or invariable. Unlike prior art presses, receptacle 30 is not a right-angled cylinder but is instead formed, in the preferred embodiment, as a segment of a torus the mean radius of which is centered at pivot point 32 where the two lever arms are connected to one another. One end 34 of receptacle 30 is open, the other end 36 being covered by flat perforated screen 38, the plane of which preferably lies diametrically across receptacle 30 perpendicular to the arc of the torus.

Second lever arm 28 bears piston 38 fixedly positioned, as by being formed integrally therewith, with respect to the second lever arm for insertion into open end 34 of receptacle 30. Piston 38 is typically an elongated solid element extending transversely from arm 28 so as to be about the same length as the depth of receptacle 30 between the ends thereof. Piston 38 is provided with means defining closed face 40 in the form of a planar surface diametrically disposed perpendicularly to the arc of the torus of the piston so as to be insertable into open end 34 of receptacle 30. In the preferred embodiment, face 40 is defined by a wafer or short cylinder fixedly mounted, as by being formed integrally therewith, so as to form one end of piston 38 and has a cross-section configuration and cross-section dimensions substantially matching the like cross-sectional configuration and dimensions of receptacle 30. In the preferred embodiment, the periphery of face 40 is provided with or surrounded by ring 42 of a tough polymer, such as nylon or the like, with a very low coefficient of friction. The outside diameter of the periphery of polymeric ring 42 is selected to form a tight sliding fit within receptacle 30. It will be appreciated that the entire surface and edges of face 40 can be formed of a single material such as a polymer if desired.

It will be thus seen that at least the face of piston 38 and receptacle 30 are both shaped to conform to a common arc having a radius of curvature defined by the distance from the pivot point of the two levers to the center of the piston, which arc is traversed by the piston and receptacle as the two lever arms are moved relative to one another around the pivotal connection of the lever arms.

Preferably, the entire press 20 is formed of stainless steel or the like, but may be formed of other materials, such as high molecular weight polymers, provided that at least the body of piston 38 and the inner surfaces of receptacle 30 are formed of very durable, hard material such as stainless steel.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In a hand-operated garlic press including a first lever arm having adjacent one end thereof an elongated hollow receptacle extending therethrough with one end of said receptacle being covered by a perforated screen, the other end of said receptacle being open; and a second lever arm having a first end thereof mounted at a pivot point on said one end of said first lever arm and bearing a piston positioned for insertion into said open end of said receptacle so as to trap within said receptacle material to be pressed between said piston and said screen; the improvement wherein:

said piston is an elongated solid element connected to and fixedly positioned with respect to said second lever arm, and including a closed, substantially circularly-shaped face having a predetermined diameter;

said receptacle is an elongated hollow element formed as a segment of a toroid with a circular cross-section, the axis of elongation of said toroid conforming to an arc having a radius of curvature defined by the distance between said pivot point to the center of said face of said piston.

2. In a hand press as defined in claim 1 including means for at least edging the periphery of said piston face with a ring to insure a tight sliding fit of said piston within said receptacle.

3. In a hand press as defined in claim 2 wherein said ring is formed of a durable high molecular weight polymer.

* * * * *